(12) United States Patent
Harbison et al.

(10) Patent No.: US 9,428,969 B2
(45) Date of Patent: Aug. 30, 2016

(54) CLAMP

(71) Applicant: Trelleborg Offshore U.K. Ltd., Lancashire (GB)

(72) Inventors: Austin Harbison, Lancashire (GB); David Somerville, Lancashire (GB)

(73) Assignee: Trelleborg Offshore U.K. Ltd., Lancashire (GB)

( * ) Notice: Subject to any disclaimer, the term of this patent is extended or adjusted under 35 U.S.C. 154(b) by 0 days.

(21) Appl. No.: 14/386,716

(22) PCT Filed: May 20, 2013

(86) PCT No.: PCT/GB2013/051311
§ 371 (c)(1),
(2) Date: Sep. 19, 2014

(87) PCT Pub. No.: WO2013/171521
PCT Pub. Date: Nov. 21, 2013

(65) Prior Publication Data
US 2015/0068759 A1    Mar. 12, 2015

(30) Foreign Application Priority Data
May 18, 2012    (GB) .................................. 1208783.9

(51) Int. Cl.
*E21B 17/01*    (2006.01)
*F16L 1/24*    (2006.01)
(Continued)

(52) U.S. Cl.
CPC ............... *E21B 17/012* (2013.01); *F16B 2/08* (2013.01); *F16L 1/20* (2013.01); *F16L 1/24* (2013.01); *F16B 2/10* (2013.01)

(58) Field of Classification Search
CPC .......... E21B 17/012; F16B 2/08; F16B 2/10; F16L 1/20; F16L 1/24
See application file for complete search history.

(56) References Cited

U.S. PATENT DOCUMENTS 2,489,535 A * 11/1949 Montague ........................ 24/281
4,338,045 A *  7/1982 Cour .............................. 405/172
(Continued)

FOREIGN PATENT DOCUMENTS

DE    2223785 B1    6/1973
EP    1980778 A2    10/2008
(Continued)

OTHER PUBLICATIONS

"International Search Report received in PCT/GB2013/051311, mailed Apr. 17, 2014".
(Continued)

*Primary Examiner* — James G Sayre
(74) *Attorney, Agent, or Firm* — Suzannah K. Sundby, Esq.; Canady + Lortz LLP

(57) ABSTRACT

The present Invention concerns a clamp (20) for mounting upon an elongate member such as a riser (24) to be deployed underwater. The clamp may for example be intended to prevent movement of a buoyancy module along a riser. The clamp comprises a plurality of clamp bodies (22) to be placed at circumferential intervals about the elongate member. A strap (42) is provided which is to be placed around the clamp bodies and tensioned to urge the clamp bodies toward the elongate member, enabling the clamp to resist movement along it. The clamp bodies comprise respective spring elements (28) which are arranged, when the clamp is assembled and mounted, between the clamp bodies and the elongate member. The clamp bodies and the spring elements are shaped to permit them to be used in clamps having a range of different diameters and having a differing number of clamp bodies.

21 Claims, 11 Drawing Sheets

(51) Int. Cl.
*F16B 2/08* (2006.01)
*F16L 1/20* (2006.01)
*F16B 2/10* (2006.01)

(56) References Cited

U.S. PATENT DOCUMENTS

| | | | |
|---|---|---|---|
| 4,455,720 A * | 6/1984 | Sutton | 24/20 S |
| 7,744,314 B2 | 6/2010 | Eide | |
| 2008/0245933 A1 | 10/2008 | Stokes | |
| 2008/0251668 A1 | 10/2008 | Stokes | |
| 2008/0286049 A1* | 11/2008 | Eide | 405/171 |
| 2008/0289829 A1* | 11/2008 | Bergeron et al. | 166/350 |
| 2009/0272855 A1* | 11/2009 | Oram | 248/67.5 |
| 2010/0216360 A1 | 8/2010 | Kato | |
| 2013/0193289 A1* | 8/2013 | Goffman | 248/231.51 |

FOREIGN PATENT DOCUMENTS

| | | | | |
|---|---|---|---|---|
| GB | 1277364 A | 6/1972 | | |
| GB | 2076749 A | 12/1981 | | |
| GB | 2288205 A | * 10/1995 | | F16B 2/08 |
| GB | 2459553 A | 4/2009 | | |
| WO | 9827373 A1 | 6/1998 | | |
| WO | 9837355 A1 | 8/1998 | | |
| WO | 0011387 A1 | 3/2000 | | |
| WO | 2004090348 A1 | 10/2004 | | |

OTHER PUBLICATIONS

"Search Report received in GB120873.9, dated Aug. 13, 2012".

* cited by examiner

--PRIOR ART--

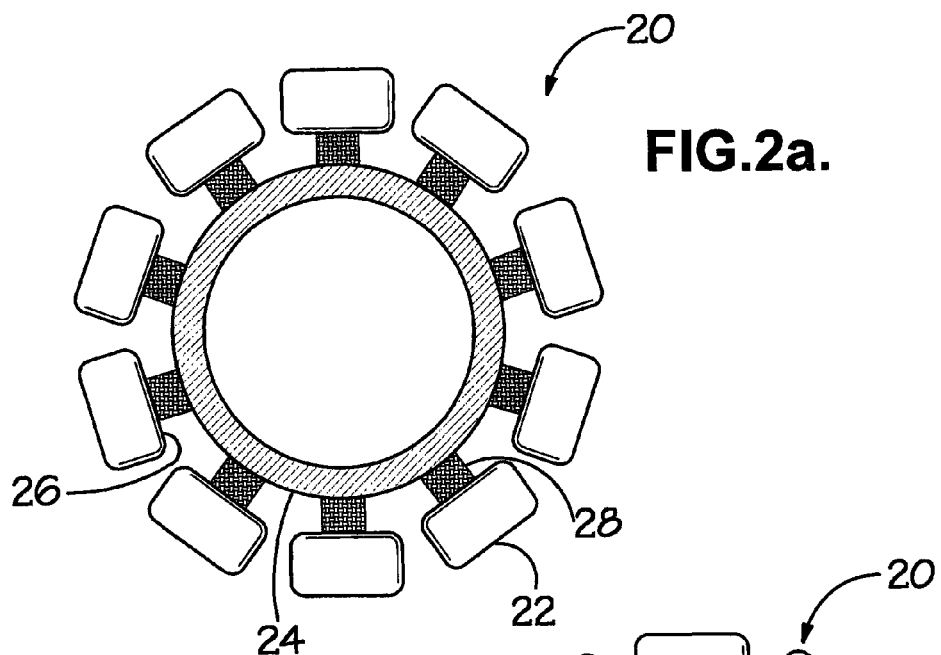
FIG.2a.
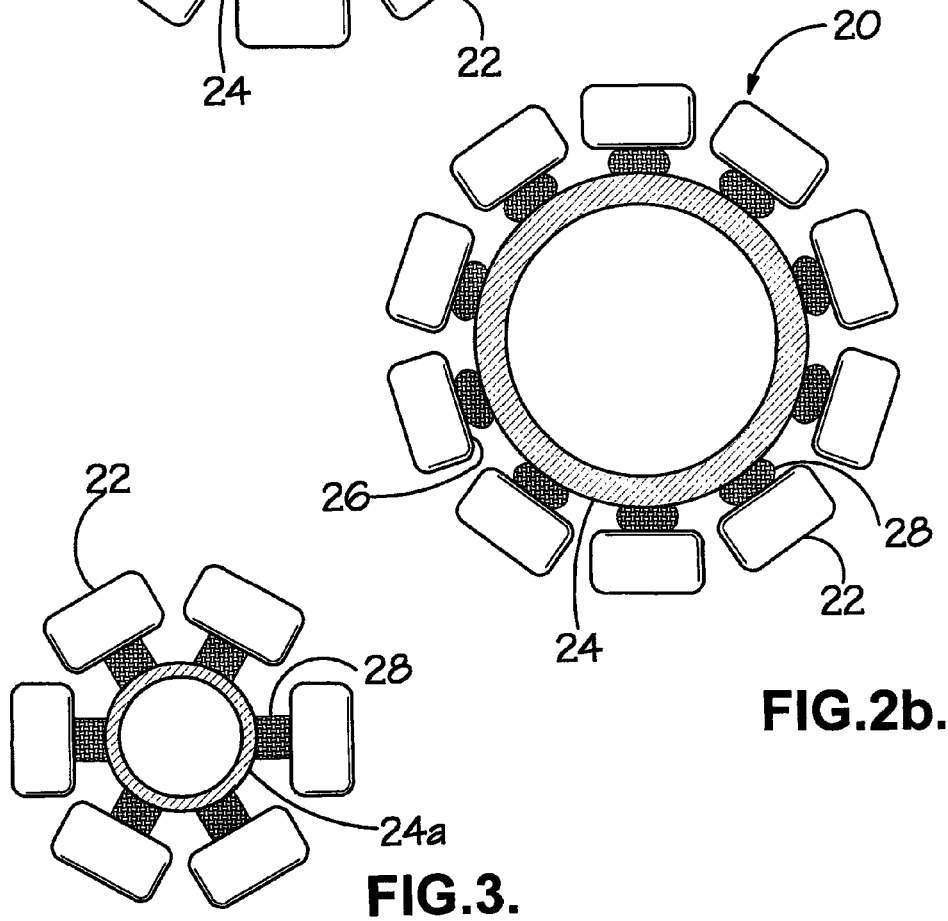
FIG.2b.
FIG.3.

--PRIOR ART--

CLAMP

The present invention relates to clamps for mounting on elongate members to be deployed underwater. Clamps embodying the invention are particularly, but not exclusively, suitable for locating buoyancy upon marine risers used in subsea hydrocarbon extraction.

In extraction of oil and gas, tubular members extend from the wellhead to the surface platform. Such members include the "risers"—flowlines through which the hydrocarbons are conducted to the surface. Known riser systems include steel catenary risers, which as their name implies adopt a catenary form, and flexible risers, which are often provided with distributed buoyancy modules at chosen positions along their length to support them in a chosen configuration, such as the lazy S or steep S configurations which are well known to the skilled person. FIG. 1 illustrates an example. A buoyancy module 10 is formed as a pair of semi-annular floats which together define a through-going passage to receive the riser 12 and which, after assembly upon the riser, are held together by bands 14. Other tubular members such as umbilicals are also provided with distributed buoyancy.

A reliable means is needed to prevent the buoyancy module 10 from moving along the riser 12. In FIG. 1 this function is performed by a clamp 16 which is securely mounted upon the riser 12 and is received in an internal pocket of the buoyancy module 10.

The technical requirements relating to the clamp 16 are demanding. It must have a long design life, since the lifetime of a riser installation can be a period of decades, and reliability over this extended period is of great commercial importance since clamp failure is potentially catastrophic for the riser installation. Individual buoyancy modules 10 are typically large and the forces to be borne by the clamp are correspondingly large. The diameter of the riser or umbilical 12 may vary due e.g. to manufacturing tolerances. It may also change over time, e.g. due to creep caused by the clamping force, or due to increase of hydrostatic pressure upon deployment of the riser. A variable degree or curvature of the riser along its length may also need to be accommodated.

The prior art contains numerous clamps for this purpose. GB 2288205, applied for in the name of CRP Marine Ltd (a predecessor in title of the present applicant), discloses a clamp having two or three part-annular clamp shells to be arranged around the riser. Inner part-cylindrical faces of clamp shells have a radius of curvature closely matched to that of the riser, although it is suggested in the application that they may have a resilient covering to allow intimate clamp/riser contact despite some slight variation of riser diameter. A titanium band surrounds the clamp shells and is tensioned by means of bolts linking the band's two ends to keep the clamp in place. The clamp shells may be moulded from syntactic foam.

Other known clamps have dispensed with the band around the clamp shells, instead using bolts to link the shells and draw them toward one another. EP 1850044 (applied for by Balmoral Group Ltd and since withdrawn) provides an example.

There are various prior art clamps in which resilient components are used to sustain the required clamping force and/or to accommodate variable riser diameters, which may for example change over time due to creep. One such clamp uses shells similar to those of GB 2288205 provided with blocks of elastomeric material on their inner faces, so that it is the elastomer blocks that seat upon the riser. The blocks are stressed during assembly of the clamp and maintain the required clamping force despite subsequent changes such as creep of the riser itself.

According to the present invention, there is a clamp for mounting upon an elongate member to be deployed underwater, the clamp comprising a plurality of clamp bodies for placement at circumferential intervals about the elongate member and a strap which is adapted to be placed around or through the clamp bodies and tensioned to urge the clamp bodies toward the elongate member so that the clamp is able to resist movement along the elongate member, wherein the clamp bodies comprise respective spring elements which are arranged, when the clamp is assembled and mounted, between the clamp bodies and the elongate member and the clamp bodies and the spring elements are shaped to permit them to be used in clamps having a range of different diameters and having a differing number of clamp bodies.

The present invention makes it possible to provide clamp bodies of a single type which can be used in a range of different clamps of varying diameters. The number of clamp bodies can be chosen according to the diameter of the member upon which the clamp is to be mounted.

The clamp bodies can be substantially cuboidal in shape. Alternatively they may have a box section. Their dimension along the circumferential direction (about the elongate member) is typically small, in comparison with the prior art clamps described above. The clamp bodies' inner faces need not be shaped to match the curvature of the elongate member. They may for example be essentially flat.

Specific embodiments of the present invention will now be described, by way of example only, with reference to the accompanying drawings, in which:

FIGS. 2a and 2b are simplified views along the riser's axis of parts of a clamp embodying the present invention;

FIG. 3 is similar to FIG. 2a but shows the clamp mounted on a smaller diameter riser;

Figure 1:
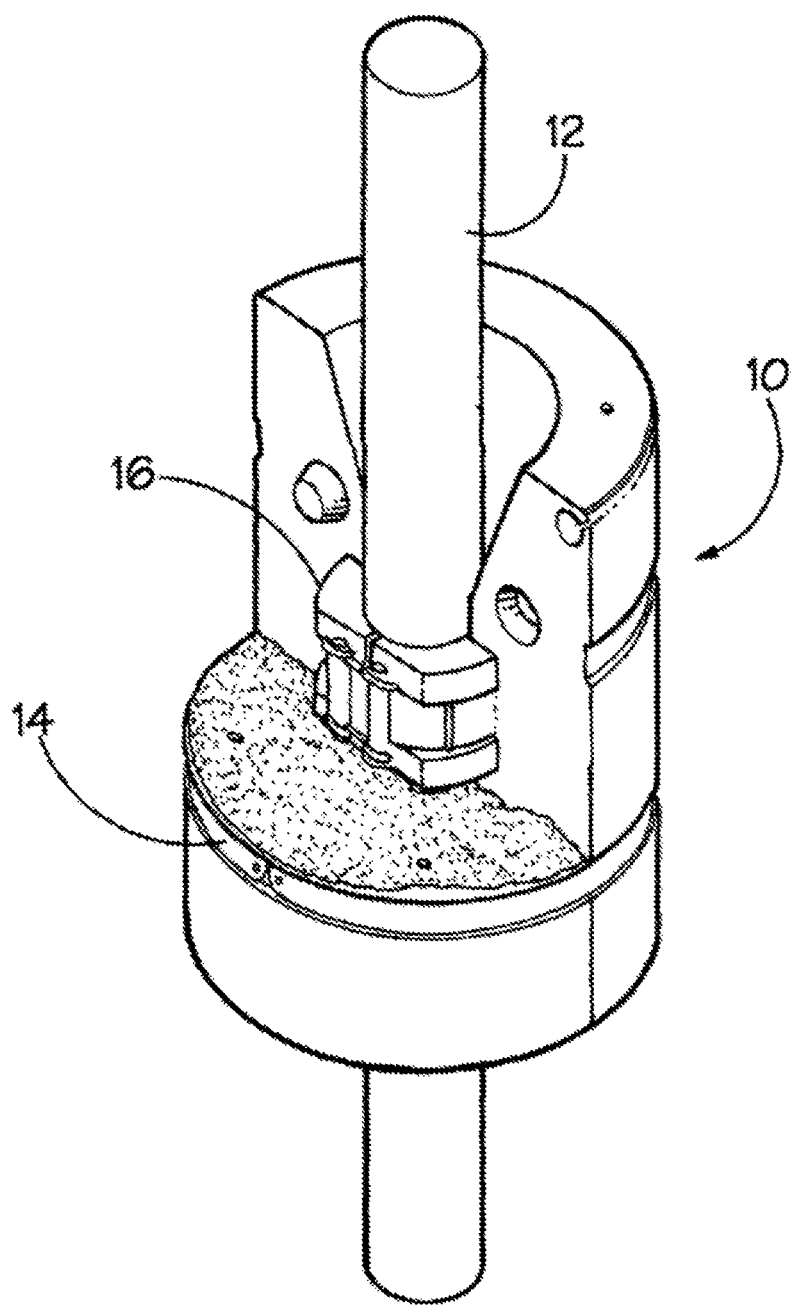
FIG. 1 shows a buoyancy element mounted upon a riser and located by means of a clamp which is in this example of a known type, not embodying the present invention.

In embodiments of the present invention, clamp bodies which do not have the part-annular shape of above described prior art clamps are circumferentially arranged around a cylindrical riser in a configuration that can be thought of as being polygonal. The number of clamp bodies can be chosen according to the riser diameter and correspondingly the polygon they form can be a square, pentagon, hexagon, heptagon, octagon, decagon, etc. It is not intended to impose a minimum or maximum number on the clamp bodies, but anything from two to sixteen is currently envisaged. In this way clamp bodies of a single type can be used in clamps intended for a wide range of riser diameters. Suppliers and users may keep in stock a supply of perhaps a single type of clamp body, or a small number of different sizes, ready to be used in a wide range of apparatus. The above described disadvantages associated with machining of clamp bodies to match a specific riser diameter can thus be avoided.

FIGS. 2a and 2b serve to illustrate the operation of a clamp 20 embodying the present invention. The clamp comprises multiple separately formed clamp bodies 22 for arrangement around a riser 24 upon which the clamp 20 is to be mounted. In the illustrated example the clamp bodies 22 are placed at regular circumferential intervals about the riser 24. Each clamp body 22 has a radially inner face 26 provided with a respective spring element 28. In the present embodiment the spring elements 28 are formed as blocks of elastomer. Rubber is suitable. Natural rubber is the favoured material. Stiffening elements may be incorporated into the spring elements 28. The spring elements 28 seat upon the riser 24.

The clamp additionally comprises a strap which is omitted from FIG. 2 for simplicity but is passed around the clamp bodies 22 in a loop and is tightened to secure the clamp in place. When the strap is tight, it draws the clamp bodies 22 radially inwards and compresses the spring elements 28, as seen in FIG. 2b. It will be apparent that in this embodiment the spring elements 28 are compressed along radial directions and exert forces along these directions. Being prestressed upon installation, the spring elements 28 can accommodate a degree of reduction in riser diameter, e.g. due to creep, without permitting excessive reduction in the clamping force.

Figure 9:
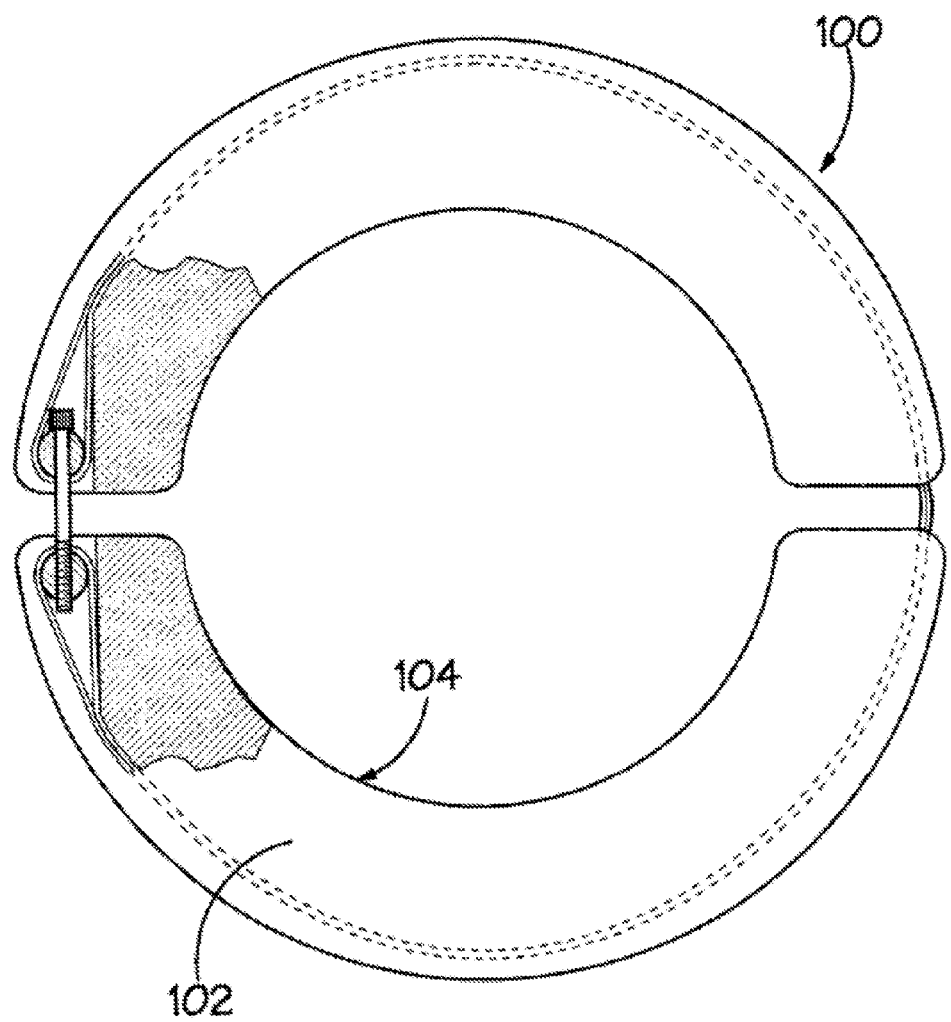
FIG. 9 is a drawing taken from prior art document GB 2288205, representing a riser clamp of known type.

Comparing the clamp of FIG. 2 with the prior art clamp 100 of FIG. 9, distinctions will be immediately apparent. The prior art clamp 100 has a small number (two, in the illustrated example) of clamp shells 102 whose internal faces 104 are part-circular, with a radius closely matched to that of the riser to ensure intimate contact. The shape of the clamp shells determines the number of shells that is used—it would not be possible, with the FIG. 9 clamp, to add a third clamp shell to adapt the clamp for use on a larger riser.

By contrast, the clamp 20 embodying the present invention can be easily adapted for use on risers having a wide range of diameters. The inner faces 26 of the clamp bodies 22 do not need to be shaped to match the riser's curvature. In the illustrated example these faces are flat. The clamp bodies 22 are shaped to allow a variable number of them to be used, according to the riser diameter. Whereas the example seen in FIG. 2 uses ten clamp bodies 22, the FIG. 3 example has just six of them seated on a riser 24a of relatively small diameter. A standardised clamp body 22 can thus be used in a wide range of different applications.

Figure 4:
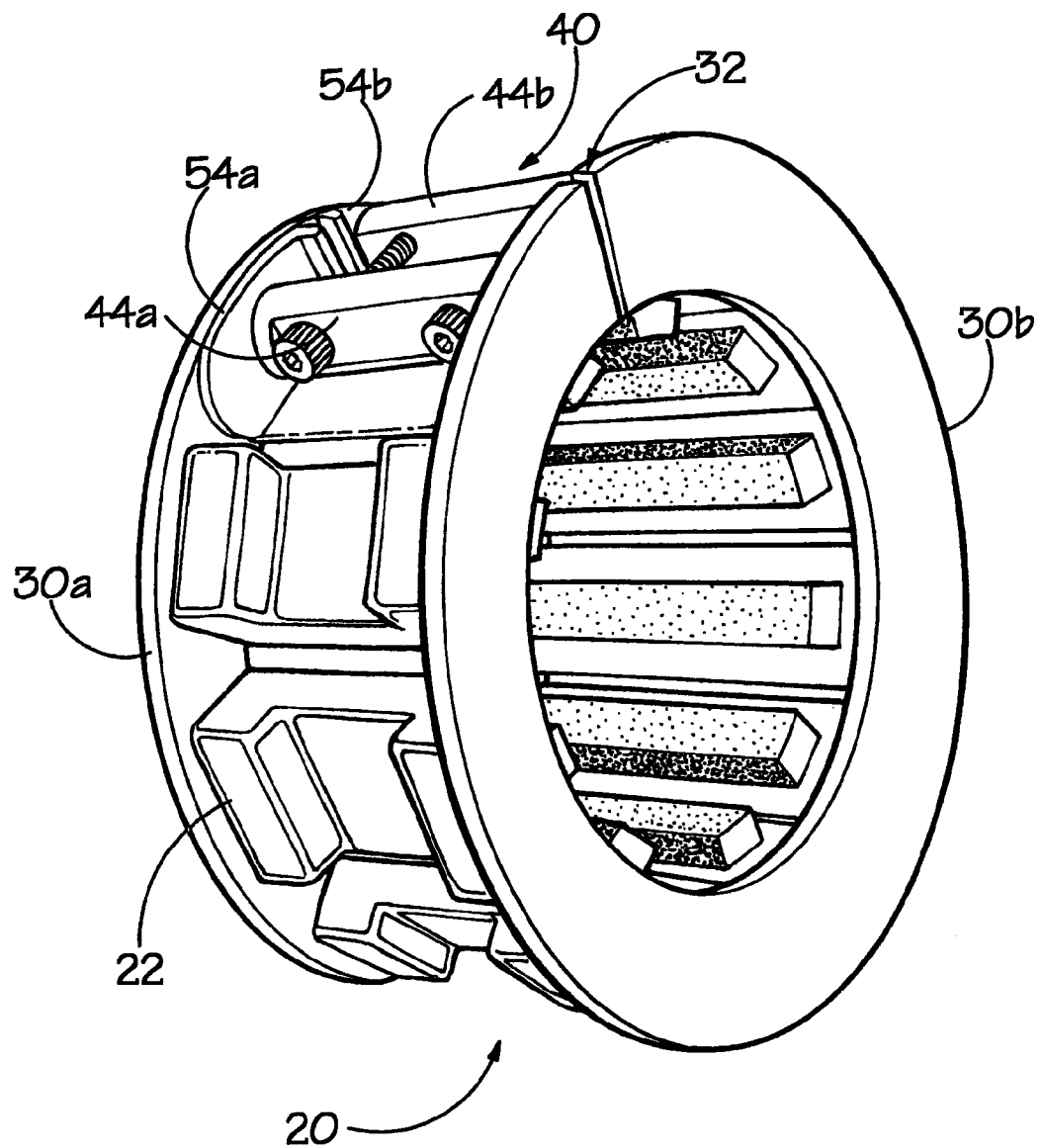
FIG. 4 is a perspective illustration of a clamp embodying the present invention.

It is desirable that the clamp should be easy and quick to install. The clamp bodies 22 may be flexibly attached to one another so that they form a single assembly (or conceivably a small number of sub-assemblies which can be handled and arranged upon the riser 24 during assembly). Also the clamp bodies 22 must initially be circumferentially spaced from one another to allow them freedom to move radially inwards as the spring elements 28 are compressed during installation. Both functions may be performed by a flexible spacer arrangement coupling the clamp bodies 22 together. In FIG. 4 the flexible spacer arrangement comprises flexible rings 30a, 30b on opposite sides of the clamp 20. Each clamp body 22 is secured at each of its ends to a respective flexible ring 30a, 30b. This may for example be achieved by moulding the flexible rings 30a, 30b with the clamp bodies 22 in situ, so that end portions of the clamp bodies 22 are embedded in the rings. There are numerous alternatives. For example adhesive could be used to secure these parts together. Durability is not necessarily a crucial factor here since in some embodiments the spacer arrangement serves no structural purpose after clamp installation. The flexible rings 30a, 30b must allow the clamp 20 to be opened out to allow the riser to be introduced into it, and are split along lines 32 for this purpose. The spacer arrangement must accommodate radial movement of the clamp bodies 22. In the illustrated embodiment the flexible rings 30a, 30b comprise polyurethane foam with a hardness of 10-50 Shore A, and are flexible enough to permit the required movement. Other foam or elastomeric materials may be used.

Figure 7:
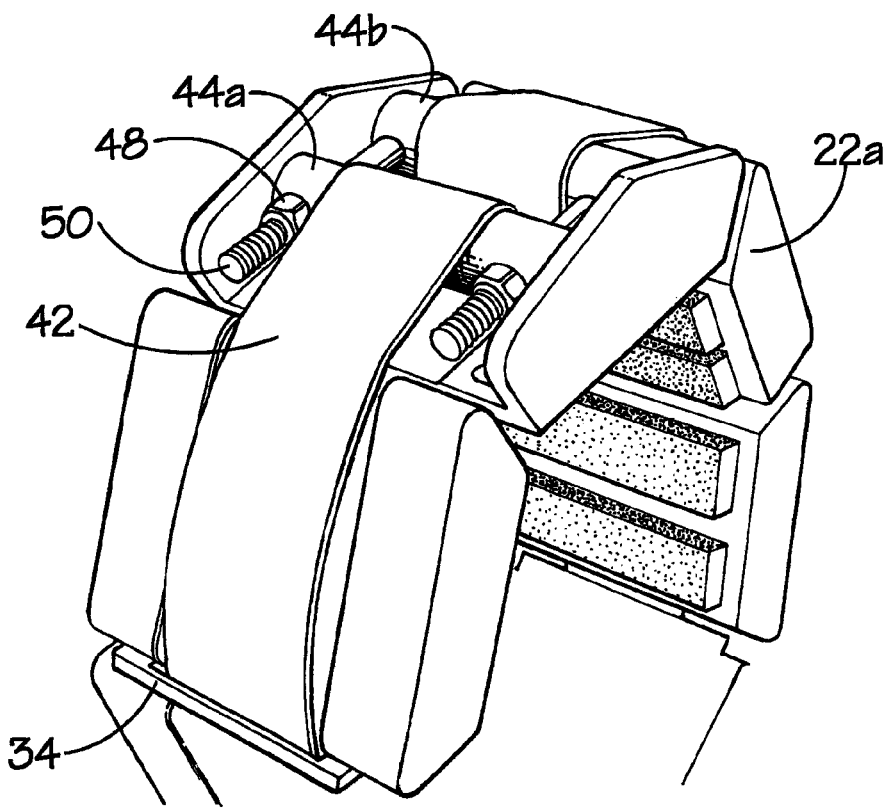
FIG. 7 is a perspective illustration of a further clamp embodying the present invention.
Figure 8:
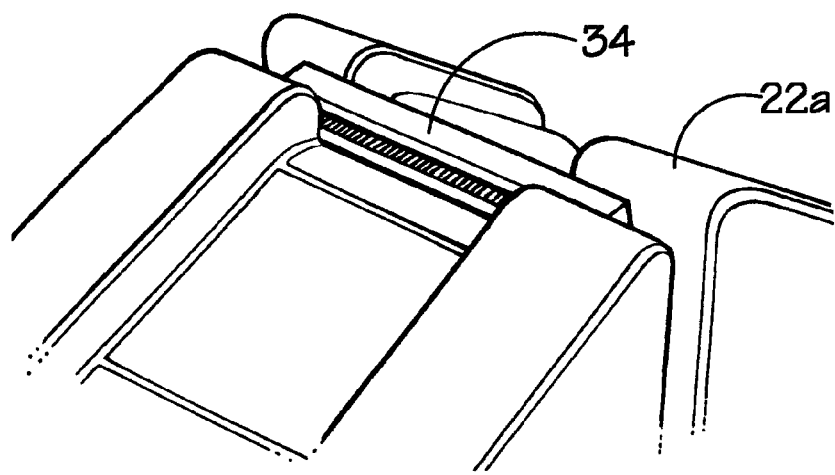
FIG. 8 shows a clamp body spacer arrangement of the clamp of FIG. 7.

The spacer arrangement may take a variety of other forms. For example FIGS. 7 and 8 show an alternative construction in which end faces of neighbouring clamp bodies 22a are coupled through individual elastomer spacers 34.

By virtue of the spacer arrangement the clamp bodies 22 predominantly react as a single system with multiple hinge points. During installation the spacer arrangement urges the segments to remain equispaced as the radial pressure applied from the strap closes the clamp. However, the level of circumferential strain must not be so large that it would cause the elements to react as one entity, such that they could lock together into a hoop and any subsequent load would enter into the segments and not be transferred in the form of radial pressure into the riser.

The spacer arrangement could in other embodiments be dispensed with altogether. In this case clamp mounting may be facilitated by provision of a tool to carry the clamp bodies 22 and suitably space them about the riser ready for them to be secured in place using the strap.

Figure 6A:
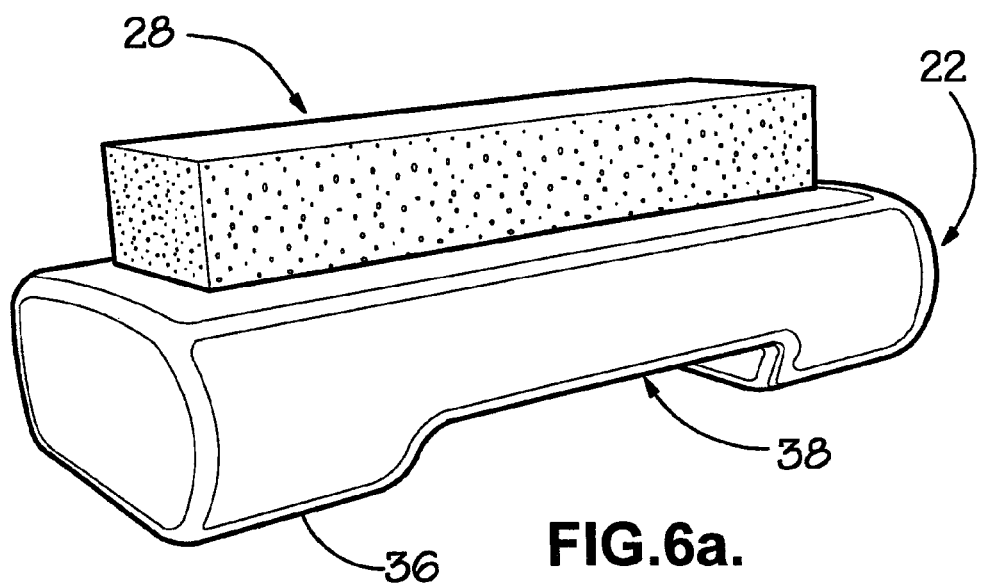
FIGS. 6a and 6b are perspective illustrations of a single clamp shell used in the clamp of FIGS. 4 and 5.
Figure 6B:
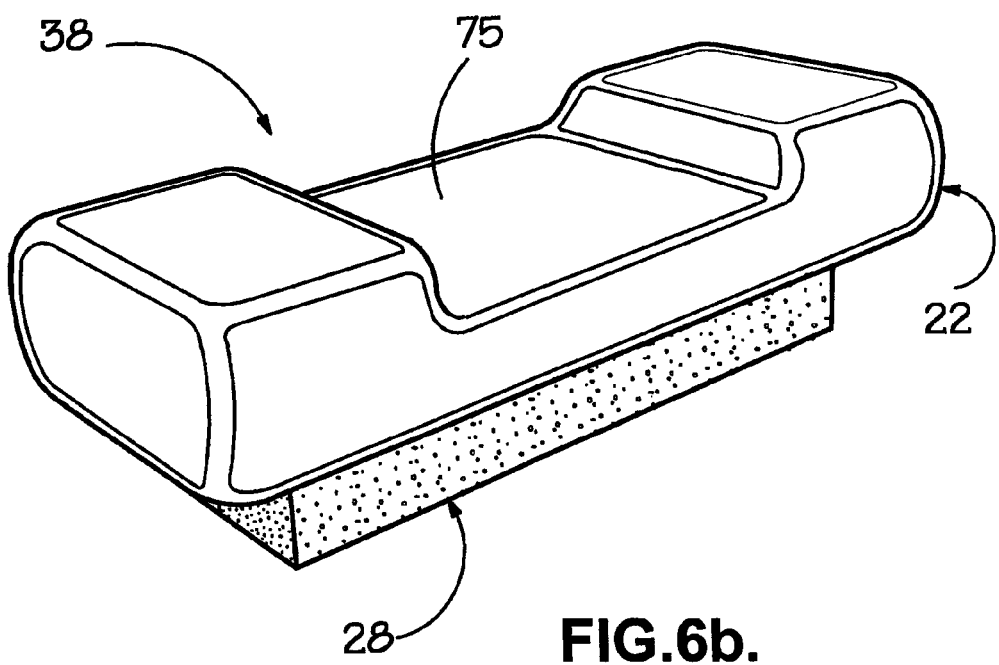

The shape of the clamp body 22 can best be appreciated from FIGS. 6a and 6b. It is, in the present embodiment, a generally cuboidal block. Its dimension along the clamp's circumferential direction is relatively small, allowing a relatively large number of individual clamp bodies to be used. Vertices are rounded, facilitating moulding of the clamp body 22 and helping to prevent concentrations of stress in it. Outer surface 36 has a depressed channel 38 which receives and locates the strap used to secure the clamp in place. The clamp body 22 is moulded, in the illustrated example. It comprises material with high compressive strength. Plastics composite materials are suitable. These may be particle or fibre reinforced plastics. The illustrated example comprises syntactic foam—a material with a plastics matrix containing hollow micro and/or macro-balloons. Suitable syntactic foams are known to those skilled in the art. Other materials could be used. In some embodiments it is envisaged that the clamp bodies 22 will be injection moulded. Low creep thermoplastics, whether injection moulded or not, can be used. Specifically, the material may comprise glass filled thermoplastic, polypropylene, polyethylene, polystyrene, styrene acrylanitrile, nylon, polyurethane or corrosion resistant metals.

The clamp bodies 22 are preferably net shape or at least near net shape. That is, their shape is wholly or at least largely determined by the moulding process, with little or no subsequent machining being needed. This is in contrast to the prior art clamps of FIGS. 1 and 9, whose clamp shells required extensive post-moulding machining due to their shape and the requirement for the clamp shell's inner faces to be accurately formed to match riser diameter. Clamp bodies capable of use on a range of riser diameters can thus be kept in stock, by a supplier or a user, avoiding the lead time needed to manufacture a clamp for a particular application.

Figure 5:
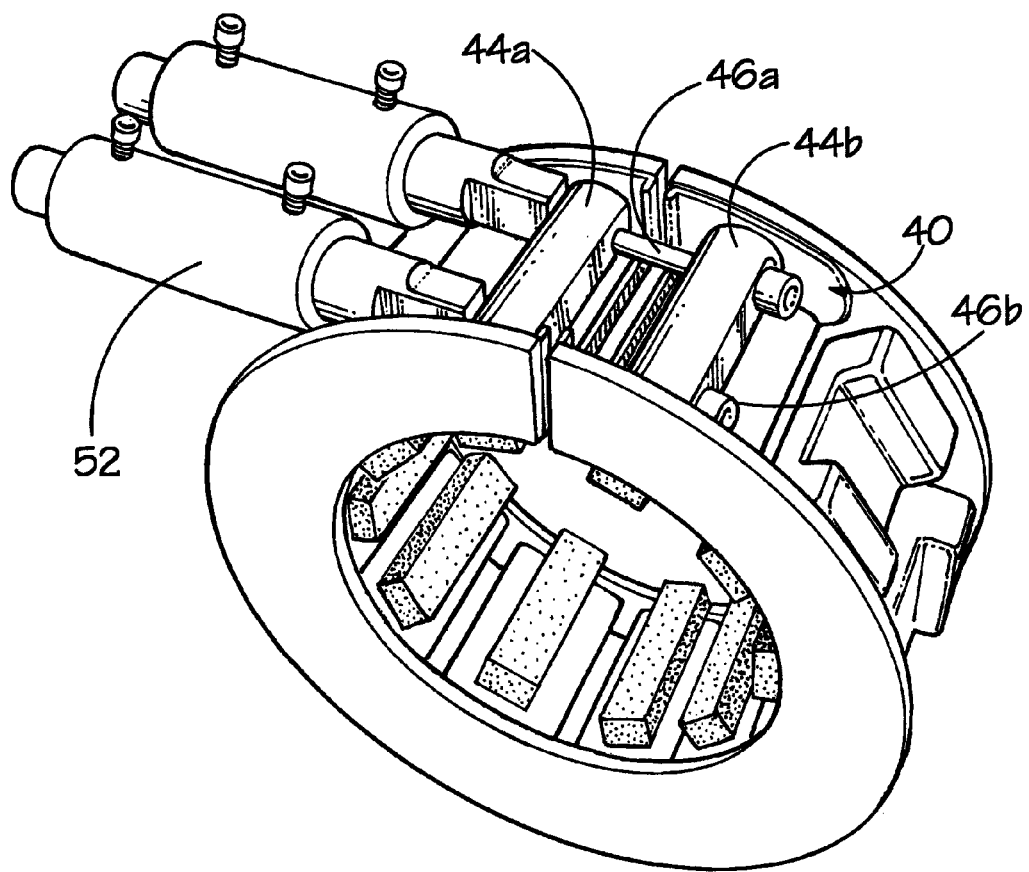
FIG. 5 illustrates the same clamp seen in FIG. 4 but additionally shows tensioning devices used during clamp installation.

FIGS. 4 and 5 show a tensioning assembly 40 used to tension the strap, but omit the strap itself. The strap can however be seen at 42 in FIGS. 7 and 10. The strap needs to be able to sustain the required tension over the clamp's design lifetime without excessive stretching. Aramid fibre is the preferred material for the strap but other materials may be used. Kevlar® is the most favoured material. Fibre materials are suitable, e.g. of polyamide, polyester or polyethylene. The strap 42 extends around the clamp bodies 22 and its ends are drawn together by the tensioning assembly 40. In the illustrated embodiment tension bars 44a, b are passed through loops at opposite ends of the strap 42 and are pulled together by a pair of threaded fastener arrangements 46a, b (each formed by a nut 48 and a bolt 50).

The strap 42 may be tensioned simply by tightening the threaded fastener arrangements 46a, b, but for the sake of speed it may be preferable to draw the strap 42 tight using tensioning devices 52 (see FIG. 5), which may for example be hydraulic or pneumatic, before tightening the threaded fastener arrangements 46a, b to maintain strap tension. The tensioning devices 52 would then be detached and removed.

The tensioning assembly 40 sits in a shallow housing formed by two housing parts 54a, b of "U"-shaped section (see FIG. 4 in particular). Nylon is the preferred material for these parts but other materials could be substituted. High strength (modulus) materials are favoured. In some prior art clamps contact of tension bars used to tension the strap with the material forming the clamp bodies created a stress concentration which could limit the clamp's capabilities. Other previous clamps have used floating tension bars, but this could lead to an excessive gap between clamp elements which could be detrimental. By having the bars rest upon a material chosen to have suitable properties, the FIG. 4 embodiment avoids or alleviates these problems.

The threaded fasteners 46a, b preferably should not protrude outside the radius defined by the clamp bodies 22, since they may then foul the surrounding buoyancy. The travel required of the tension bars 44a, b in order to adequately compress the spring elements 28 can be substantial, and can dictate the length of the threaded fasteners 46a, b. The use of a stiff material to form the seat for the tension bars 44a, b allows the radial depth of the clamp bodies 22 beneath the bars to be small, minimising this design issue.

Numerous modifications may be made to the design of the clamp without departing from the scope of the present invention. For instance the shape of the clamp bodies 22 may be modified. In the above described embodiment it is generally cuboidal. In the embodiment illustrated in FIG. 7 the clamp bodies 22a have end faces which are generally flat and which converge in the radially inward direction, so that viewed along the riser axis the shape of the clamp bodies is a truncated "V". The angle of this "V" is chosen with regard to the number of clamp bodies to be used, and this shape potentially limits somewhat the range of clamp diameters that can be achieved.

Figure 10:
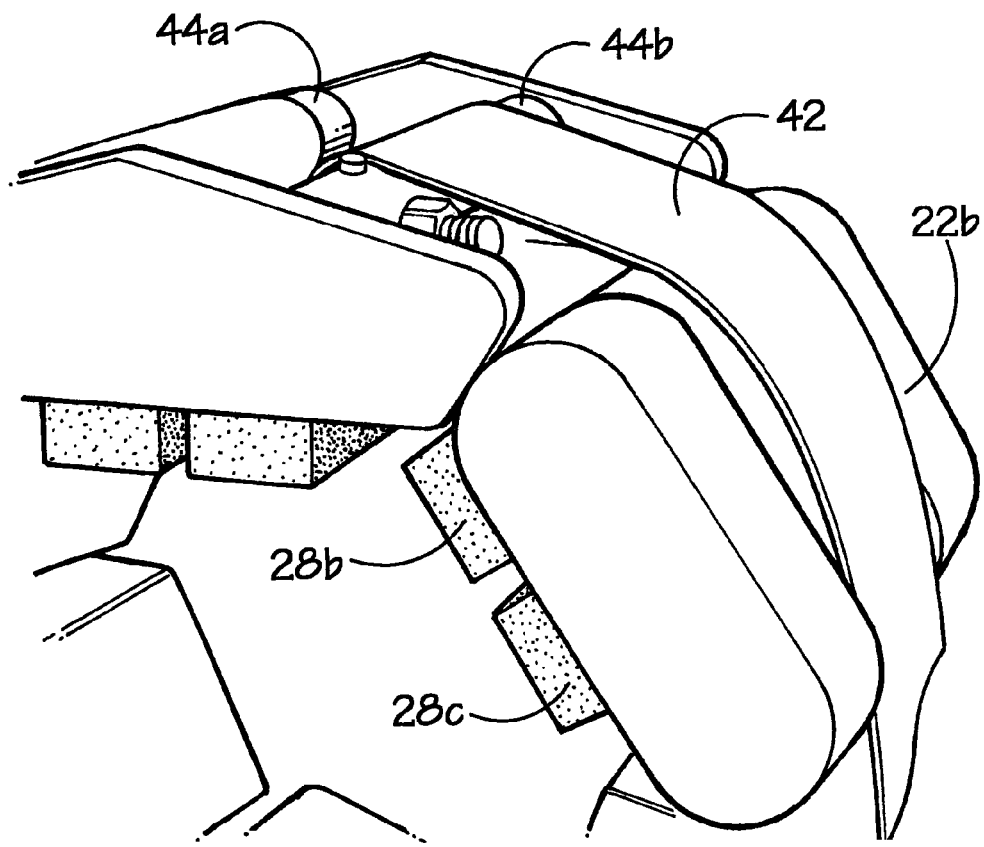
FIG. 10 is a perspective illustration of still a further clamp embodying the present invention.
Figure 11:
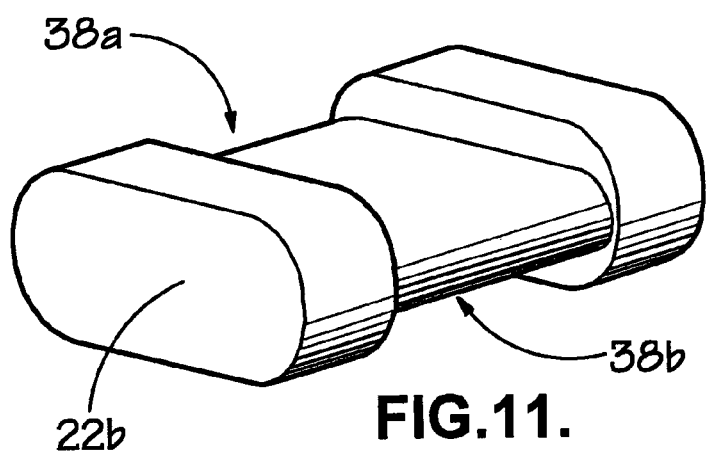
FIG. 11 is a perspective illustration of a clamp body of the FIG. 10 clamp.

The clamp bodies 22 may carry multiple spring elements 28. For example FIG. 10 shows a clamp in which each clamp body 22b has a pair of spring elements 28b, 28c. In this example the clamp body 22b has a respective shallow "U" shaped channel or depression 38a, 38b on both its inner and its outer faces as seen in FIG. 11, the channel on the inner face receiving the spring elements 28b, 28c and the channel on the outer face receiving the strap 42.

Figure 12:
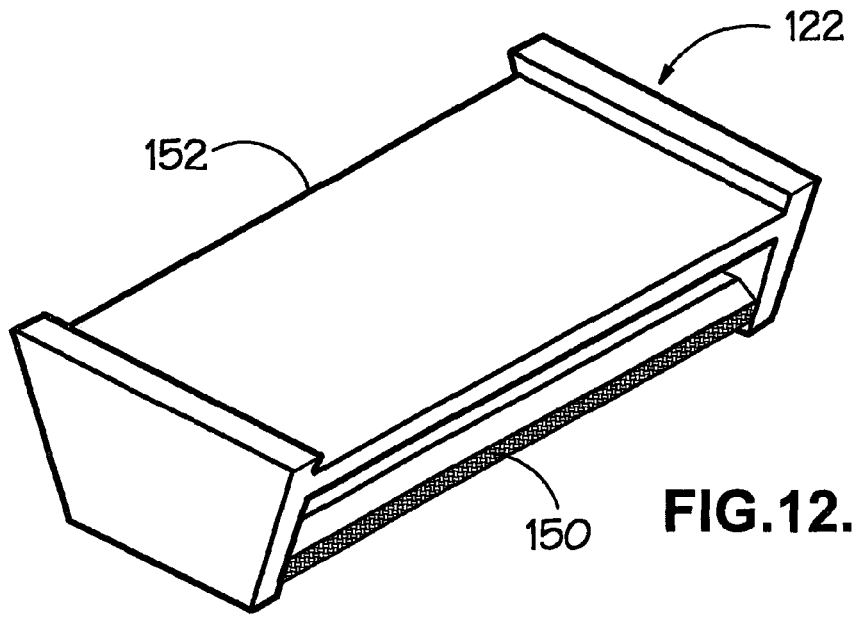
FIG. 12 is a perspective illustration of a clamp body according to a further embodiment of the present invention.
Figure 13:
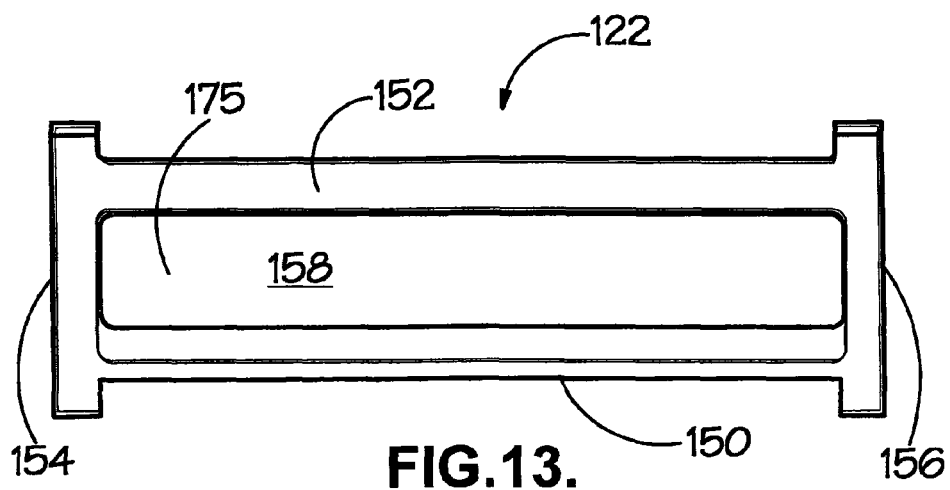
FIG. 13 is an end view of the clamp body of FIG. 12.

Instead of moulding the clamp bodies 22 individually, they can be manufactured using an extrusion process. FIGS. 12 to 15 illustrate an embodiment of this type. FIGS. 12 and 13 show the clamp body 122, whose shape is somewhat different from the above described clamp bodies 22, having a pressure plate 150 coupled to an outer plate 152 by end walls 154, 156. A through-going opening 158 is thus formed between the pressure plate 150 and the outer plate 152 to receive strap 142. The clamp body 122 can be described as having a box section, when viewed along the circumferential direction. The strap 142 is thus passed through the clamp bodies 122 rather than around the outside of them (see FIG. 15). In this way the clamp can straightforwardly be kept together as a single unit prior to and during installation. However elastomeric spacers as described above may be used, between neighbouring clamp bodies 122, in this embodiment.

In a preferred development of the clamp seen in FIGS. 12 to 15, an additional band (not shown) is provided to retain the clamp bodies 122 together prior to installation of the clamp. This is because some forms of strap 142 should desirably be loaded in tension only. The additional band can protect the strap 142 from undesirable loading of other forms. It may be passed through the clamp bodies 122, outside the strap 142. It may be formed as a flat band of flexible material such as polyethylene.

Figure 14:
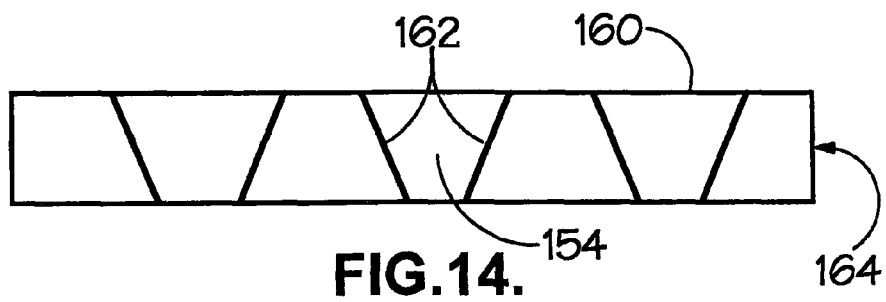
FIG. 14 is a side view of an extrusion from which the clamp body of FIGS. 12 and 13 can be formed.

FIG. 14 shows an extrusion 160 from which the clamp bodies 122 can be cut. The extrusion 160 has the profile seen in FIG. 13, when viewed along its length (i.e. along the direction of arrow 164). Lines 162 show where the cuts will be made. By cutting at alternating angles, the wedge shape of the end walls 154 is formed. The separation of the cuts 162—and hence the length of the clamp bodies 122 along the tangential direction—can easily be varied during manufacture, according to the range of riser diameters that the clamp is to accommodate. Known extrusion techniques using for example an adjustable die can also be used to adjust the width, along the riser's axial direction, of the extruded clamp bodies 122.

Figure 15:
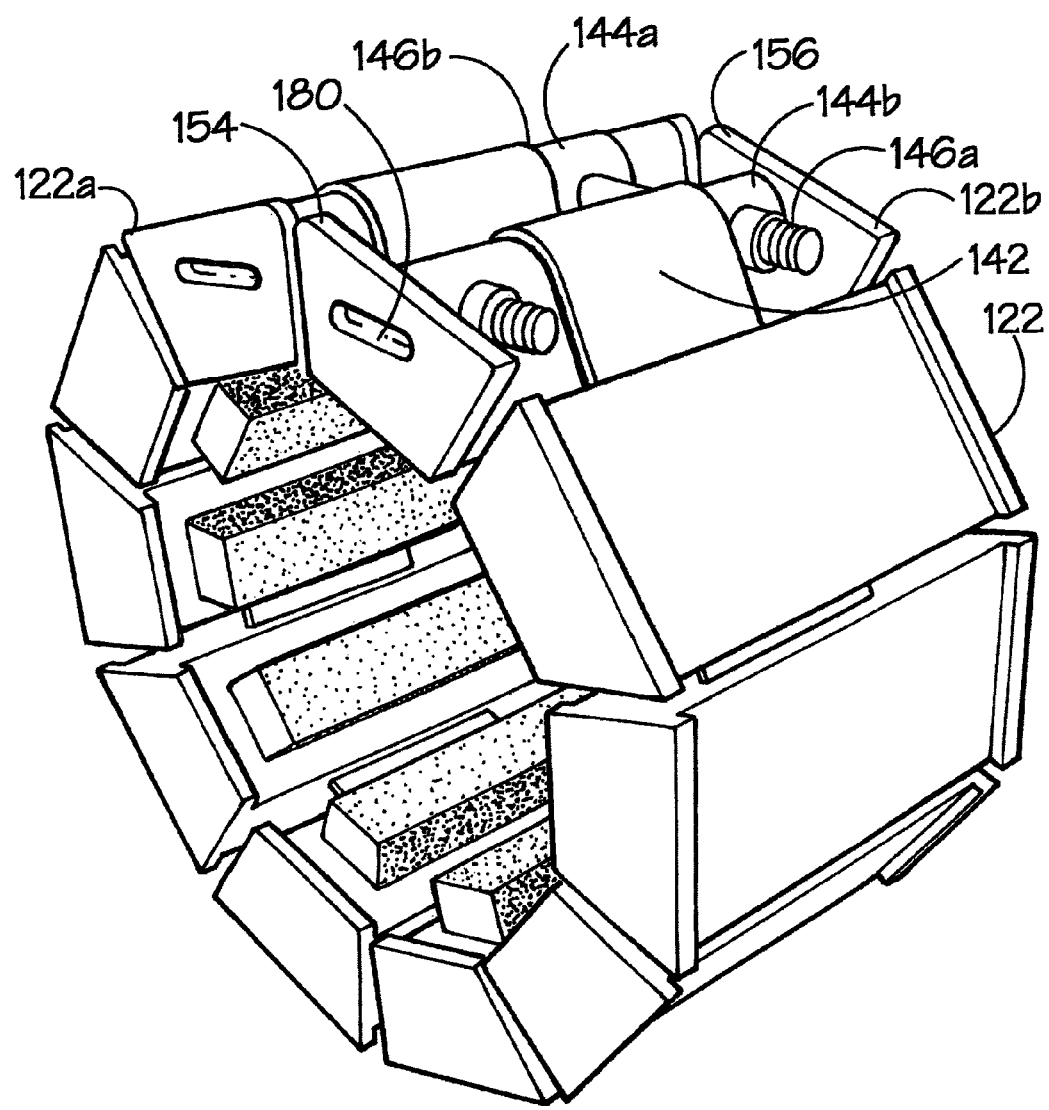
FIG. 15 is a perspective view of a clamp using the clamp body of FIGS. 12 and 13.

In the FIG. 15 embodiment, tension bars 144a, b used to tension the strap 142 are captive upon respective clamp bodies 122a, 122b. For this purpose end walls 154, 156 of these clamp bodies have respective channels 180. Dowels (not shown) protrude from ends of the tension bars 144a, b into the channels 180, retaining the bars while permitting them to move along the tangential direction. In this embodiment, releasing threaded fasteners 146a, b allows the clamp bodies 122a, 122b to be separated from one another to open out the clamp ready to receive the riser.

Figure 16:
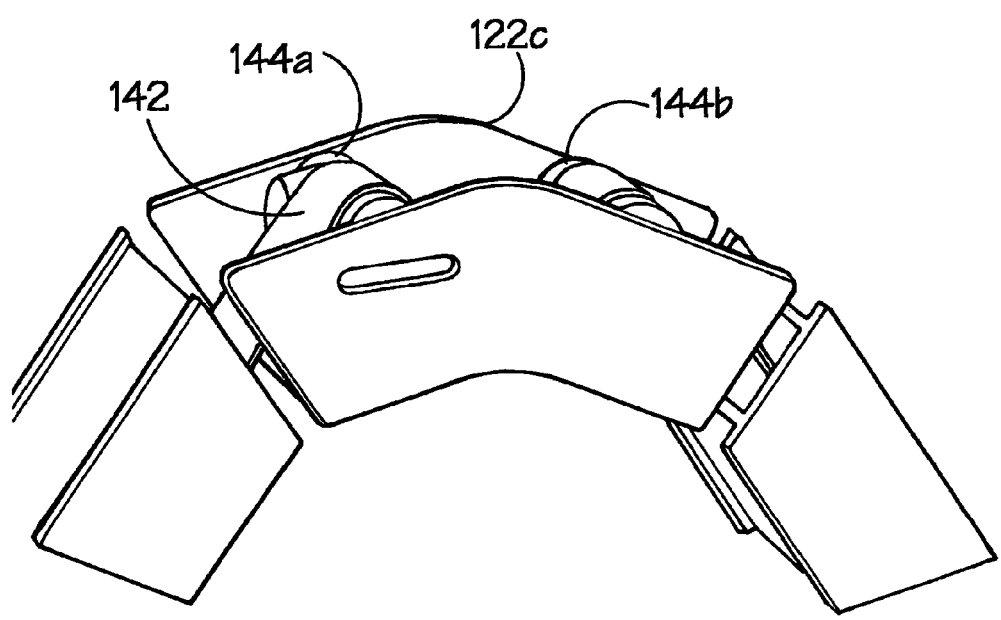
FIG. 16 shows part of a clamp which is a construction variant of that seen in FIG. 15.

However, having the tension bars 144a, b retained upon two separate clamp bodies 122a, b may leave these bodies undesirably prone to movement as the strap 142 is tensioned. FIG. 16 shows an alternative in which only one of the tension bars 144a is captive upon a clamp body 122c. The other end of the strap carries tension bar 144b which is not captive. Some means may be provided to prevent tension bar 144b from sliding out of the strap 142. For example an interference fit elastomeric washer (not shown) may be placed on the threaded fasteners. In this example the single clamp body 122c upon which both tension bars 144a, b seat is oversize, in order to accommodate them.

A particular design issue concerns transfer of load (radial force) from the strap 42, 142 to the clamp bodies 22, 122. In prior art clamps designed to seat upon a riser of known diameter, the clamp bodies had part-cylindrical outer faces for the strap to seat upon, providing even load distribution. However the clamp bodies 22, 122 are designed for use on a range of different riser diameters. Hence the diameter of the circle formed by the strap 22, 122 varies according to the application. In addition a "net shape casting"—i.e. a component whose shape is formed by the moulding process— has a surface profile with a greater manufacturing tolerance than a component whose surface is machined. As a result of the diametric range and manufacturing tolerance, clamp bodies with part-cylindrical load-bearing faces could result in unpredictable load transfer from the strap to the clamp body. In the worst case load could be applied to one side only of the clamp body, causing it to rotate excessively during tightening of the strap.

To avoid this, the illustrated clamp bodies 22, 122 have predominantly flat load bearing faces as seen at 75 in FIG. 6b and at 175 in FIG. 13. Load is thus passed largely through circumferential end regions of these faces, which are radiussed to avoid excessive local stress concentration.

Attachment of the spring elements 28 to the clamp bodies 22, 122 may be achieved in various ways. They may be bonded. Alternatively they may be shaped to mechanically interlock. For example the spring elements may comprise a protrusion, such as a nipple for receipt in a complementary bore in the clamp body 22, 122. The spring elements 28 may comprise rubber. To provide a desired spring stiffness, spring element 28 may incorporate stiffeners such as metal plates, arranged transversely with respect to the spring's direction of action. By resisting spreading of the spring, the stiffeners increase its stiffness.

Advantages offered by embodiments of the present invention include the following.

The box section of the clamp members allow for a large, deep recess to receive the strap.

The section of the clamp members also provides material bulk to resist creep, and to form a cross member.

The elastomeric substrate allows the clamp to conform to a range of riser diameters.

The term "riser" has been used in the aforegoing description to refer to the member upon which the clamp is intended to be mounted, but it must be understood that the clamp may be used upon other underwater members including for example cabling or pipelines.

The invention claimed is:

1. A kit of parts for assembly into a clamp for mounting upon an elongate member to be deployed underwater, the kit of parts comprising
    a set of separately formed clamp bodies and
    a strap,
    the clamp bodies each being shaped to provide a pressure plate coupled to an outer plate through end walls, forming a through-going opening which receives the strap, the pressure plate having an inner face which carries a spring element and an outer face,
    the aforesaid parts being configured to be assembled into a clamp in which the strap passes through the clamp bodies and bears upon said outer face of each clamp body with said springs arranged to seat upon said elongate member in a circumferential arrangement and said clamp bodies being circumferentially spaced from one another, so that the set of separately formed clamp bodies are able to move inwardly as said strap is tightened and said spring elements are thereby compressed, and so that once tightened the clamp is able to resist movement along the elongate member, and
    the clamp bodies and their spring elements being formed such that they can, without modification, be assembled into clamps having a range of different diameters and having a differing number of clamp bodies.

2. The kit of parts as claimed in claim 1 in which the clamp members are formed as a box section.

3. The kit of parts as claimed in claim 1 in which the shape of the clamp bodies enables five or more to be used in a clamp.

4. The kit of parts as claimed in claim 1 in which the clamp bodies comprise at least one of syntactic foam, low creep thermoplastics, glass filled thermoplastics, polypropylene, polyethylene, polystyrene, styrene acrylanitrile, nylon, polyurethane, or corrosion resistant metal.

5. The kit of parts as claimed in claim 1 in which the clamp bodies are moulded or injection moulded.

6. The kit of parts as claimed in claim 1 in which the spring elements comprise elastomer blocks.

7. The kit of parts as claimed in claim 1 in which the clamp bodies are coupled to one another by a spacer arrangement which comprises at least one flexible ring to which the clamp bodies are attachable.

8. The kit of parts as claimed in claim 1 in which the clamp bodies are coupled to one another by a spacer arrangement which comprises at least one elastomer element disposed between neighbouring clamp bodies and coupling them to one another.

9. The kit of parts as claimed in claim 1 in which the clamp bodies are coupled to one another by a spacer arrangement which comprises a flexible connector, in addition to the aforementioned strap, which is passed through or otherwise engages with the clamp members to retain them together as a unit prior to installation of the clamp.

10. The kit of parts as claimed in claim 1 in which the clamp members have a trapezoidal shape, viewed along an axial direction of the clamp.

11. The kit of parts as claimed in claim 10 in which the clamp members are cut from an elongate moulding or extrusion, the cuts that separate the clamp members forming the legs of a trapezium of the trapezoidal shape.

12. The kit of parts as claimed in claim 1 in which the clamp members comprise fibre-reinforced plastics or particle-reinforced plastics.

13. The kit of parts as claimed in claim 1 in which at least one of the spring elements has a direction of compression and comprises a resilient body incorporating stiffening members oriented laterally to the direction of compression of the spring, to resist lateral expansion of the resilient body and so increase spring stiffness.

14. The kit of parts as claimed in claim 1 in which the spring elements comprise rubber.

15. The kit of parts as claimed in claim 1 in which the spring elements interlock with the clamp bodies.

16. A method of locating buoyancy on a submerged elongate member against movement along said elongate member, the method comprising providing a strap;
    providing a set of separately and identically formed clamp bodies each being shaped to
    provide a pressure plate coupled to an outer plate through end walls, forming a through-going opening which receives the strap, the pressure plate having an inner face which carries a spring element and an outer face against which the strap bears;
    selecting a number of said clamp bodies according to the diameter of the elongate member;

arranging the clamp bodies in a circumferential arrangement about the elongate member, with said clamp bodies being circumferentially spaced from one another;

arranging the strap around the clamp bodies to form a clamp;

tightening the strap, so that said spring elements are compressed and said clamp bodies move radially inwardly, and so that said clamp is able subsequently to resist movement along the elongate member; and mounting a buoyancy module around the clamp.

17. A clamp for mounting upon an elongate member to be deployed underwater, the clamp comprising a strap; and a set of separately formed clamp bodies each being shaped to provide a pressure plate coupled to an outer plate through end walls, forming a through-going opening which receives the strap, the pressure plate having an inner face which carries a spring element and an outer face;

the strap being disposed around the clamp bodies bearing upon said outer face of each clamp body with said springs arranged to seat upon said elongate member in a circumferential arrangement and said clamp bodies circumferentially spaced from one another, so that by virtue of their circumferential spacing the set of separately formed clamp bodies are able to move inwardly as said strap is tightened and said spring elements are thereby compressed, and so that once tightened the clamp is able to resist movement along the elongate member; and the clamp bodies and their spring elements being formed such that they can, without modification, be assembled into clamps having a range of different diameters and having a differing number of clamp bodies.

18. The clamp as claimed in claim 17 in which the clamp members are formed as a box section.

19. The clamp as claimed in claim 17 in which the shape of the clamp bodies enables five or more to be used in a clamp.

20. The clamp as claimed in claim 17 in which the spring elements comprise elastomer blocks.

21. The clamp as claimed in claim 17 in which said spacer arrangement comprises a flexible connector, in addition to the strap, which engages with the clamp members to retain them together as a unit prior to installation of a clamp.

* * * * *